United States Patent [19]

Van Niekerk

[11] Patent Number: 4,966,515
[45] Date of Patent: Oct. 30, 1990

[54] LOAD HANDLING SYSTEM

[76] Inventor: Daniel G. Van Niekerk, 2 Lynwood, Attwell Street, Denlee, Transvaal, South Africa

[21] Appl. No.: 214,432

[22] Filed: Jul. 1, 1988

[30] Foreign Application Priority Data

Jul. 1, 1987 [ZA] South Africa ............... 87/4758

[51] Int. Cl.⁵ .................................... B60P 1/36
[52] U.S. Cl. ................................ 414/528; 414/531; 414/501; 198/841; 193/35 SS
[58] Field of Search ........... 414/529, 530, 531, 532, 414/533, 534, 535, 536, 528, 501, 502; 193/35 R, 37, 35 A, 35 SS; 198/837, 841, 836

[56] References Cited

U.S. PATENT DOCUMENTS

| | | | |
|---|---|---|---|
| 2,710,105 | 6/1955 | Schwartz | 414/528 X |
| 2,973,073 | 2/1961 | Elliott | 193/35 SS X |
| 3,228,542 | 1/1966 | Achammer | 414/531 X |
| 3,319,767 | 5/1967 | Breternitz et al. | 198/841 X |
| 3,439,790 | 4/1969 | Langley et al. | 414/531 X |
| 3,848,538 | 11/1974 | Hondzinski | 198/841 X |
| 3,854,610 | 12/1974 | Carder | 414/528 X |
| 3,951,254 | 4/1976 | Juhrend | 414/528 X |
| 4,358,010 | 11/1982 | Besch | 198/841 X |
| 4,562,921 | 1/1986 | Leemkuil et al. | 198/841 |

Primary Examiner—Frank E. Werner
Attorney, Agent, or Firm—Wegner & Bretschneider

[57] ABSTRACT

The invention provides a load handling system which includes at least one roller guideway arranged to support and guide a load along a predetermined path, and pneumatically operated load support members disposed parallel to the guideway which are movable between a retracted position is which they allow the load to move freely on the guideway, and an extended position in which they are forced into contact with and lift the load off the guideway. A roller chain drive mechanism moves the load along the guideway. The system can be installed in a cargo vehicle and uses the compressed air system of the vehicle.

12 Claims, 3 Drawing Sheets

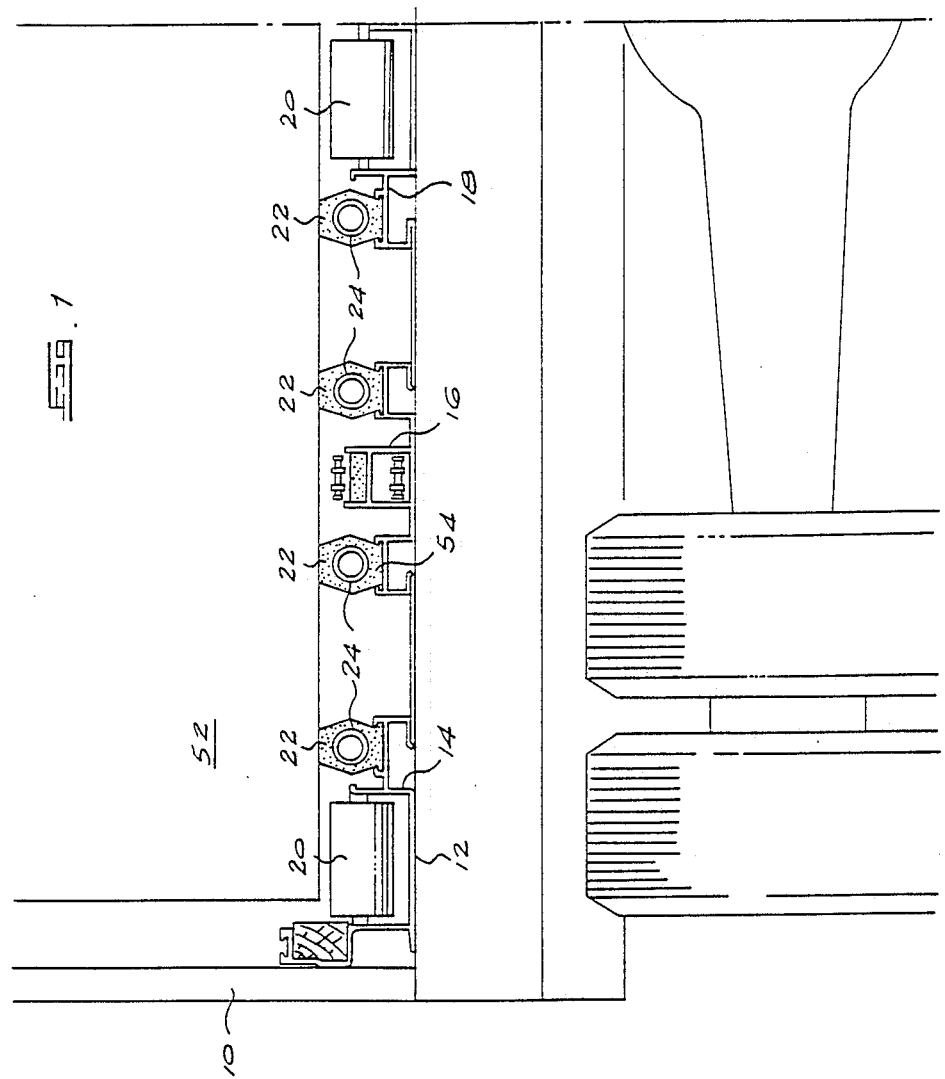

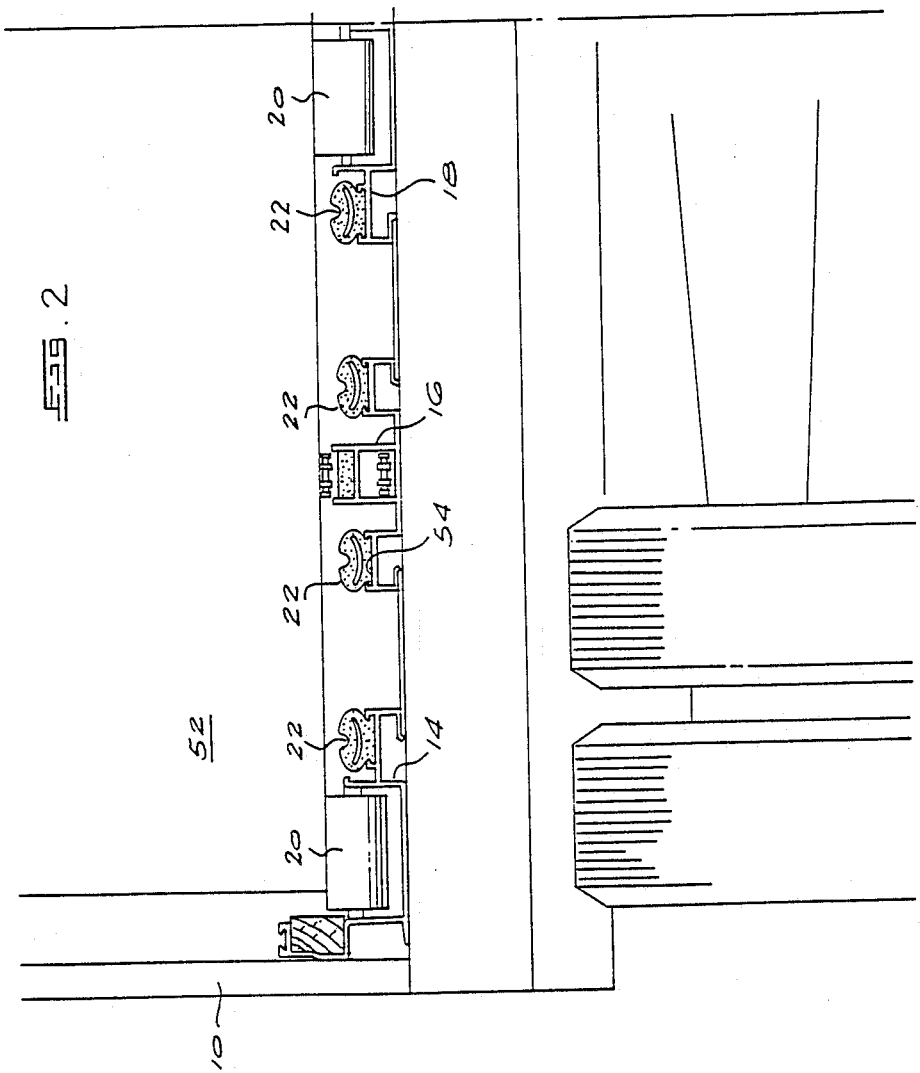

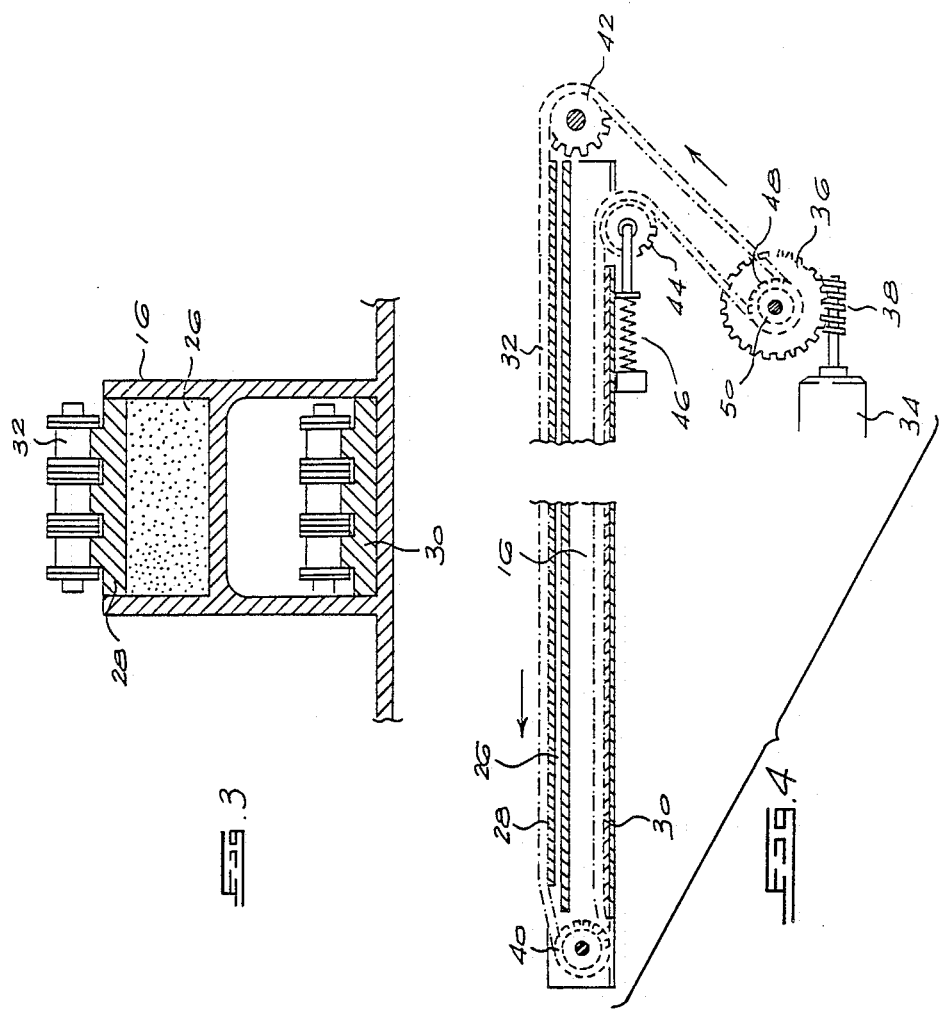

LOAD HANDLING SYSTEM

BACKGROUND OF THE INVENTION

This invention relates to a load handling system.

Many heavy vehicles have been designed to transport large cargo containers of standard dimensions. The use of such containers speeds up the handling of large loads considerably. In order to move a large, heavy container or pallet into the back of a cargo vehicle, some form of mechanised load handling system is usually employed. In its simplest form, such a system could comprise a number of sets of rollers disposed along the length of the floor of the vehicle, so that containers can be rolled into and out of the vehicle. Provision must, of course, be made for securing the load while the vehicle is in motion.

A more sophisticated load handling system employs sets of rollers mounted in the floor of a cargo vehicle, the rollers being raised pneumatically by compressed air to allow loading and unloading of the vehicle, and being dropped below the level of fixed supports on the floor, so that the load rests on the supports, while the vehicle is in motion. A disadvantage of this system is the fact that it is relatively complex, since each roller must be movable. In order to provide adequate mechanical strength, the system also tends to be relatively heavy.

SUMMARY OF THE INVENTION

According to the invention a load handling system includes at least one guideway arranged to support and guide a load along a predetermined path, and at least one pneumatically operated load support member disposed adjacent to the guideway which is movable between a retracted position in which it allows the load to move freely on the guideway, and an extended position in which it is forced into contact with and immobilizes the load.

The guideway may comprise at least one set of rollers, at least one load support member being disposed adjacent to each set of rollers.

In a preferred embodiment of the invention, the guideway is fitted in the floor of a cargo vehicle which is adapted to receive cargo containers, the containers being loaded and unloaded with the load support members retracted, and being transported with the load support members extended, so that the load is stable during transportation thereof.

The load support member may comprise an elongate resilient member which is inflatable, the member assuming its extended position when inflated and assuming its retracted position when deflated.

BRIEF DESCRIPTION OF THE DRAWINGS

FIG. 1 is a partial rear view of a cargo vehicle fitted with a load handling system according to the invention;

FIG. 2 is a view similar to that of FIG. 1 but showing the load handling system with deflated load support members;

FIG. 3 is a sectional view on the line A—A in FIG. 1; and

FIG. 4 is a schematic side view of a roller chain drive system incorporated in the load handling system.

DESCRIPTION OF A PREFERRED EMBODIMENT

Referring to FIGS. 1 and 2, a heavy cargo vehicle 10 has a floor 12 which includes, on either side of its centre line, three extruded aluminium profiles 14, 16 and 18. The extrusions 14, 16 and 18 are bonded to steel sheeting to form an integral floor which is effectively stiffened by the extrusions. The extrusions are disposed in sets symmetrically on either side of the centre line of the vehicle. Each of the extrusions 14 and 18 defines a channel, along the length of which are disposed live rollers 20. Adjacent the rollers, along the length of each extrusion 14 and 18, is fitted a flexible extruded rubber or plastics load bearing member 22 in which is located a high pressure flexible hose 24. The extrusion 16 is located between the extrusions 14 and 18 and is symmetrical about its centre line. On each side of the centre line is fitted a further rubber load bearing member 22. The load bearing members are shaped to clip into channel-like grooves 54 in the extrusions 14, 16 and 18. The central portion of the extrusion 16 defines a roller chain pathway, which is shown in greater detail in FIGS. 3 and 4.

As seen in FIG. 3, the extrusion 16 defines an open channel above an enclosed tubular space. A strip of tough, resilient plastics foam 26 lies in the channel, with a tough ribbed plastics wear strip 28 being placed on top of the foam 26. A similar wear strip 30 lies in the bottom of the tubular space. An endless roller chain 32 is guided by the channel of the extrusion 16 and runs on the wear strips 28 and 30.

FIG. 4 shows the arrangement of the roller chain drive mechanism. An electric motor 34 drives a gear wheel 36 via a worm 38. Bearings 40 and 42 are located at opposite ends of the extrusion 16, which is cut away at the end nearest the rear of the vehicle to allow the chain to pass out of the tubular space, around an idler 44 which forms part of a tensioning mechanism 46, and around a drive sprocket 48 which is attached by a shaft 50 to the gear wheel 36. The drive mechanism includes a friction clutch which can be incorporated in the motor assembly or in the sprocket drive, as desired.

The air hoses 24 in the rubber load bearing members 22 are all connected to a source of compressed air which is derived from the compressed air system of the vehicle and which is controlled automatically by a switch or switches sensitive to opening of the rear doors of the vehicle. The compressed air system preferably includes a reservoir, a pressure regulating device, and a manual override system.

When the vehicle is to be loaded or unloaded, the rear doors (not shown) of the vehicle are opened, causing the pressure hoses 24 to be depressurised. The rubber load bearing members 22 assume their natural retracted shape, as shown in FIG. 2. The upper surfaces of the load bearing members 22 can be seen to be below the level of the rollers 20, so that a container 52 can be loaded into or unloaded from the vehicle under the urging of the driven roller chain 32, moving freely on the rollers 20. When the doors are closed, the hoses 24 are pressurised to a typical operating pressure of 8 bar (800 kPa), causing the load bearing members 22 to assume the erect, extended position shown in FIG. 1. The load bearing members 22 raise the container 52 above the rollers 20, effectively immobilising it. The immobilising effect is particularly good because of the resilient surface of the members 22. Since the compressed air system of the vehicle operates continually while the vehicle is in use, there is no problem in maintaining the load bearing members 22 erect. If the vehicle compressed air supply should fail, the vehicle will, of course, come to a halt automatically. In such an eventuality, the compressed air reservoir of the load handling system will maintain the members 22 erect for a sufficiently long period to prevent the load from moving before the vehicle comes to a halt.

The hoses 24 are Kevlar-reinforced high pressure hoses which are tested to 24 bar (24 MPa), and can be expected to have a long operating life in the described application. Each hose 24 is connected to the compressed air system by a quick-release coupling, to enable ready replacement of a damaged load bearing member 22. A dual compressed air circuit can be provided to prevent failure of the system should one of the hoses 24 leak. In their deflated condition, the load bearing members 22 can be easily pulled out of their locating grooves in the extrusions 14, 16 and 18 and can be replaced quickly.

Advantages of the described system include the fact that it is mechanically simple and light, relatively quick and simple to install, and easy to repair if necessary. A minimum of extra components are required in addition to the normal compressed air system of a standard cargo vehicle. It is particularly advantageous that the described system does not require a supply of compressed air while the vehicle is stationary and is being loaded or unloaded.

Unlike systems which have pneumatically supported guide rollers, the present system provides a steady platform for goods which are being loaded or unloaded. This prevents rocking and swaying of the load, which is, of course, undesirable.

I claim:

1. A load handling system comprising:
   at least one guideway arranged to support and guide a load along a predetermined path; and
   at least one pneumatically operated load support member disposed adjacent to the guideway which is movable between a retracted position in which said load support member allows the load to move freely along the guideway and an extended position in which said load support member is forced into contact with and provides substantially the sole means to immobilize the load;
   wherein said load support member comprises an elongate resilient member containing a flexible pressure hose and having a load-bearing means defined thereon for direct frictional and deformable engagement with a bottom surface of said load and wherein said load bearing means comprises a load bearing surface which is resilient and deformable, wherein the load support member assumes the extended position when inflated and the retracted position when deflated.

2. A load handling system according to claim 1 wherein the guideway comprises at least one set of rollers, at least one load support member being disposed adjacent to each set of rollers.

3. A load handling system according to claim 1 wherein the guideway is fitted in the floor of a cargo vehicle which is adapted to receive cargo containers, the containers being loaded and unloaded with the load support members retracted, and being transported with the load support members extended, so that the load is stable during transportation thereof.

4. A load handling system according to claim 1 wherein the hose is a reinforced high pressure hose.

5. A load handling system according to claim 1 wherein the load support member is an extrusion.

6. A load handling system according to claim 1 wherein each load support member is arranged to be connected to a source of compressed air which is derived from a conventional compressed air system of the vehicle.

7. A load handling system according to claim 1 wherein each load support member is retained in a locating groove adjacent to a respective guideway, the load support member being removable from the groove when deflated.

8. A load handling system according to claim 1 wherein a drive mechanism is disposed adjacent the guideway for moving the load along the guideway, the load being lifted clear of the drive mechanism when the load support members are extended and being lowered into engagement with the drive mechanism when the load support members are retracted.

9. A load handling system according to claim 8 wherein the drive mechanism comprises an endless roller chain arranged to be driven by a motor, the chain being guided by a channel which is disposed parallel to the guideway.

10. A load handling system according to claim 9 wherein the roller chain is supported in the channel by a plastics wear strip which is in turn supported by a resilient foam strip.

11. A load handling system according to claim 1 wherein said load support member is an elongate rubber or plastics member.

12. A load handling system according to claim 1 wherein a drive mechanism is disposed adjacent the guideway for moving the load along the guideway, the load being lifted clear of the drive mechanism when the load support members are extended and being lowered into engagement with the drive mechanism when the load support members are retracted, said drive mechanism comprising an endless roller chain arranged to be driven by a motor, said roller chain being guided by a channel which is disposed parallel to the guideway, and said roller chain being supported in the channel by a plastic wear strip which is in turn supported by a resilient foam strip.

* * * * *